United States Patent
Sakuragi et al.

(10) Patent No.: US 6,183,809 B1
(45) Date of Patent: *Feb. 6, 2001

(54) SURFACE-TREATING METHOD OF SCREW PARTS

(75) Inventors: Hideyori Sakuragi, Atsugi; Kenshichiro Shima, Yokohama; Hajime Minagawa, Yokohama; Hikaru Furuta, Yokohama; Shigeto Mori, Fujisawa; Shinji Nakano, Higashiosaka; Seiji Kashiwada, Hiratsuka, all of (JP)

(73) Assignees: Nissan Motor Co., Ltd., Kanagawa; Topura Co., Ltd., Osaka-ku; Fuse Rashi, Co., Ltd., Osaka-fu; Kansai Paint Co., Ltd., Hyogo-ken, all of (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/805,440

(22) Filed: Feb. 25, 1997

(30) Foreign Application Priority Data

Mar. 1, 1996 (JP) .................................................. 8-068965
Jan. 24, 1997 (JP) .................................................. 9-024561

(51) Int. Cl.$^7$ ........................................................ B05D 7/22
(52) U.S. Cl. ........................ 427/239; 156/150; 156/272.2; 204/471; 427/388.1; 427/409; 427/435; 427/443.2
(58) Field of Search ................................ 427/327, 430.1, 427/385.5, 388.1, 409, 435, 443.2, 239; 156/150, 272.2; 204/471

(56) References Cited

U.S. PATENT DOCUMENTS 3,568,746 * 3/1971 Faroni ....................................... 151/7
4,767,665 * 8/1988 Seeger ................................... 428/328

* cited by examiner

*Primary Examiner*—Bernard Pianalto
(74) *Attorney, Agent, or Firm*—Pillsbury Madison & Sutro LLP

(57) ABSTRACT

A surface-treating method of of screw parts, which method consists of coating beforehand a liquid organic resin based coating composition capable of forming a film having a volume resistivity of $10^{14}$ Ω·cm or more at normal temperature onto a thread of screw parts to be mounted onto an automobile body by welding prior to a coating step of the automobile body, followed by heating and drying.

4 Claims, No Drawings

SURFACE-TREATING METHOD OF SCREW PARTS

BACKGROUND OF THE INVENTION

(1) Field of the Invention

The present invention relates to a surface-treating method of screw parts which method comprises coating beforehand a highly insulating organic resin based coating composition onto a thread of screw parts to be mounted onto an automobile body by welding.

(2) Description of the Background Art

In the field of an assembly of an automobile, for example, a fastening method by use of a combination of a nut with a welded bolt, or a bolt with a welded nut has been known in the art. That is, a normal fastening method comprises mounting the bolt or the nut by welding onto a body, chassis, suspension and the like, followed by coating and fastening with a nut or bolt respectively, and the normal fastening method has widely been used as a method having high workability, because welding of either the bolt or the nut makes the use of a detent unnecessary. After mounting the bolt or the nut by welding, however, spatters, i.e. molten metal droplets due to a welding operation carried out therearound may be scattered and adhered onto the thread of the screw parts, or a catianic electrodeposition coating film formed as an undercoating for the automobile body is thickly deposited on the thread, resulting in producing on fastening various troubles such as an abnormal increase in a screwed torque, development of an abnormal biting and the like because of resistance to fastening by the adhered spatter and the deposited electrodeposition coating film. For the purpose of preventing the above troubles, there is known in the art a method of masking the thread so that adhesion of the spatter onto, or penetration of the coating composition into the thread of the bolt or nut may be prevented. However, the above method has such drawbacks that in the actual production line, the application and removal of a mask require many manhours, resulting in reducing an assembly efficiency, and in that development of a more efficient method is demanded.

For the purpose of solving the above problems, there is also known in the art a method of coating beforehand a tetrafluoroethylene powder onto the thread of the screw parts. However, the method has such a drawback that a coated film shows poor properties in adhesion properties and wear resistance and shows difficulties in use because of easily falling off.

SUMMARY OF THE INVENTION

It is an object of the present invention to provide a surface-treating method of screw parts, which method can prevent adhesion of the spatter scattered on welding onto a thread and deposition of an electrodeposition coating film formed during a cationic electrodeposition coating step on the thread so as to provide a good screw parts-fastening workability and torque stability on screwing the screw parts in greatly reduced manhours compared with the prior art.

That is, the present invention relates to a surface-treating method of screw parts, which method consists of coating beforehand a liquid organic resin based coating composition capable of forming a film having a volume resistivity of $10^{14}$ $\Omega$·cm or more at normal temperature onto a thread of screw parts to be mounted onto an automobile body by welding prior to a coating step of the automobile body, followed by heating and drying.

DETAILED DESCRIPTION OF THE INVENTION

The screw parts, to which the surface-treating method is applied, may include a bolt and nut, and may be in the form of an untreated iron as it is, or in such a form that the surface of the iron has been subjected to a plating treatment such as galvanization or alloying galvanization by use of an alloy containing a metal other than zinc.

The organic resin based coating composition used in the present invention is required to have such characteristics that (1) the composition is a one-pack type liquid composition having good storage properties and can form a film after drying; that (2) the composition is such that a film formed therefrom has a volume resistivity of $10^{14}$ $\Omega$·cm or more at normal temperature and has good insulating characteristics; that (3) the composition has good adhesion properties onto the iron surface or the galvanized surface; that (4) the composition shows good chemical resistance; that (5) a film formed from the composition shows good wear resistance; and that (6) the composition shows good corrosion resistance.

Examples of the organic resin based coating composition satisfying the above characteristics may include (i) a fluoroacrylic resin based composition containing a mixture of a hydroxy group-containing fluoroacrylic resin containing, as the major components, perfluoroalkyl (meth)acrylate and hydroxy group-containing vinyl monomer and having a fluorine atom content of 10 to 40% by weight with a blocked polyisocyanate compound or an organotitanium compound; (ii) an epoxy resin-based composition containing, as a major component, a bisphenol type high molecular weight epoxy resin, or containing a mixture of a modified epoxy resin prepared by substituting a primary hydroxy group for epoxy groups at both molecular chain terminals of bisphenol type epoxy resin by use of alkanolamine or hydroxy acid with melamine resin or blocked polyisocyanate compound; (iii) a modified silicone resin based composition such as polyester resin-modified silicone polyester varnish, alkyd resin-modified silicone alkyd varnish, acrylic resin-modified silicone acrylic varnish, epoxy resin-modified silicone epoxy varnish and the like; (iv) resoil type oil-soluble phenol resin-modified alkyd resin varnish; (V) an alkyd resin based composition such as a melamine alkyd varnish prepared by mixing alkyd resin with melamine resin; (vi) a phenol resin based composition prepared by dissolving a novolac type or resol type phenol resin into an alcohol organic solvent; (vii) a polyurethane based composition prepared by mixing polyester resin with a blocked polyisocyanate compound; polyester varnish, polyimide varnish, polyimidoamide varnish, and the like. Of the above organic resin based coating compositions, (i) the fluoroacrylic resin based composition, (ii) the epoxy resin based composition and (iii) the modified silicone resin based composition are preferred. The organic resin based coating compositions are coated, followed by being heated and dried, resulting in that volatilization of the solvent and progress of the crosslinking reaction makes it possible to form a tough film having good properties in adhesion properties, electrical insulating properties, wear resistance and chemical resistance.

The hydroxy group-containing fluoroacrylic resin contained in the above composition (i) preferably used in the method of the present invention is a copolymer containing, as the major components, perfluoroalkyl (meth) acrylate and a hydroxy group-containing vinyl monomer.

Examples of the perfluoroalkyl (meth)acrylate may include 2,2-difluoroethyl (meth)acrylate, 2,2,2-trifluoroethyl (meth)acrylate, 2,2,3,3,-tetrafluoropropyl (meth)acrylate, 2,2,3,3,3-pentafluoropropyl (meth) acrylate, 2,2,3,4,4,4-hexafluorobutyl (meth)acrylate, 2,2,3,3,4,4,5,5-octafluoropentyl (meth)acrylate, and the like.

The hydroxy group-containing vinyl monomer may include ones having a double bond copolymerizable with the perfluoroalkyl (meth)acrylate, for example, 2-hydroxyethyl (meth)acrylate, hydroxypropyl (meth) acrylate, hydroxybutyl (meth)acrylate and the like.

If needed, other copolymerizable monomers may additionally be used. The other copolymerizable monomers may preferably include acrylic monomers such as $C_1$–$C_{10}$ lower alkyl (meth)acrylate, $C_1$–$C_6$ lower alkoxy (meth) acrylate, cyanoethyl (meth)acrylate, acrylamide, acrylic acid, methacrylic acid and the like, and may also include styrene, alkyl-substituted styrene, acrylonitrile, methacrylonitrile and the like.

The above copolymer has a fluorine atom content of 10 to 40% by weight, preferably 12 to 30% by weight. When less than 10% by weight, chemical resistance and adhesion properties onto a substrate are reduced. When more than 40% by weight, poor solubility into the organic solvent may result in separation of the resin, or increased foaming properties may cause troubles of coating workability and finish properties, and also may cause unsatisfactory fastening.

As the crosslinking agent for the hydroxy group-containing fluoroacrylic resin, a polyisocyanate compound is preferred, and the amino resin is unusable because of poor compatibility and lack of coating composition stability. The polyisocyanate compound is a compound having at least two isocyanate groups in one molecule, and may specifically include aliphatic diisocyanates per se such as hexamethylene diisocyanate, trimethylhexamethylene diisocyanate and the like; aromatic diisocyanates per se such as tolylene diisocyanate, 4,4'-diphenylmethane diisocyanate and the like; adducts of the organic diisocyanate with polyhydric alcohol, low molecular weight polyester resin or water; polymers between the organic diisocyanates, and the like. The polyisocyanate compound to be used may also include a blocked polyisocyanate compound prepared by blocking isocyanate group with a suitable blocking agent. Use of the blocked polyisocyanate compound makes it possible to obtain a one-pack type coating composition having good storage stability. The blocking agent used may include a volatile low-molecular active hydrogen compound, and may specifically include known ones, for example, aliphatic or aromatic monohydric alcohol, hydroxy-t-amine, oxime, active methylene compound, lactam, phenols and the like.

A mixing ratio of the hydroxy group-containing fluoroacrylic resin to the polyisocyanate compound is such that a molar ratio of hydroxy group in the fluoroacrylic resin to isocyanate group in the polyisocyanate compound, i.e. a OH group to NCO group ratio is suitably in the range of 0.5 to 2.5.

The crosslinking agent other than the polyisocyanate compound may preferably include an organotitanium compound represented by the general formula: $Ti(OR)_4$, wherein R represents alkyl group or aryl group, as a low temperature crosslinking agent. Examples of the organotitanium compound may include tetra-i-propoxytitanium, tetra-n-butoxytitanium, tetrakis (2-ethylhexyloxy) titanium, di-i-propoxy.bis (acetylacetone) titanate, di-n-butoxy.bis (triethanolamine) titanate and the like.

A mixing ratio between the hydroxy group-containing fluoroacrylic resin and the organotitanium compound is suitably in the range of 10 to 50 parts by weight of the organotitanium compound per 100 parts by weight of the hydroxy group-containing fluoroacrylic resin.

For the purpose of obtaining satisfactary film properties, chemical resistance and adhesion properties, a heat curing temperature on forming a coated film is required to be 140° C. or higher when the blocked polyisocyanate compound is used as the crosslinking agent, but may be 100° C. or higher to be satisfactory when the organotitanium compound is used as the crosslinking agent.

The modified epoxy resin in the composition (ii) preferably used in the method of the present invention is prepared by substituting a primary hydroxy group for epoxy groups at both molecular chain terminals of bisphenol type epoxy resin by reaction of alkanolamine or hydroxy acid with epoxy group.

Examples of the alkanolamine may include a primary amine such as monoethanolamine, isopropanolamine, 1-amino-propane-3-ol, 1-amino-butane-4-ol, 3-aminobutane-1-ol, 1-amino-pentane-5-ol and the like, a secondary amine such as diethanolamine, diisopropanolamine and the like, and the like.

Examples of the hydroxy acid may include monohydroxy monocarboxylic acid such as 3-hydroxy propionic acid, 3-hydroxy butanoic acid, 3-hydroxy-2-methyl propionic acid, 2-hydroxymethyl butanoic acid and the like, dihydroxy monocarboxylic acid such as bis (oxymethyl) acetic acid, and the like.

Reactions of formation of the modified epoxy resin are shown by the following equations:

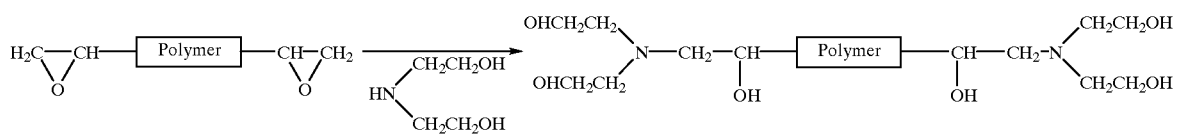

(1)

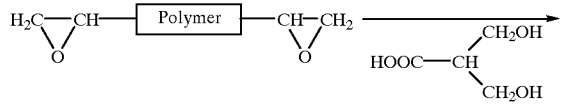

(2)

-continued

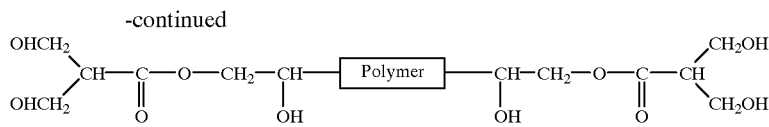

The modified epoxy resin obtained as above has a number average molecular weight of 3000 to 10000, preferably 4000 to 8500. When less than 3000, the coated film is brittle and lack of frexibility, and shows reduced chemical resistance. When more than 10,000, the viscosity of the resin is so high that a solubility into the organic solvent is reduced, resulting in causing troubles on coating workability.

On forming a coated film by use of the modified epoxy resin, use of a crosslinking agent is unnecessary and evaporation of the organic solvent results in that the resin per se can form a tough film.

The modified silicone resin based composition (iii) preferably used in the method of the present invention may include ones known in the art, for example, TSR 180, trade name of alkyd resin-modified silicone resin, TSR 194, trade name of epoxy resin-modified silicone resin, marketed by Toshiba Silicone Co., Ltd. respectively, and the like.

A method of coating the organic resin based coating compression onto the screw parts is explained in the following.

A dip.spin coating process is well known in the art as a method of coating the machine screw parts. On mounting the screw parts by the electric resistance welding, application of the above process, however, results in coating a whole surface of the screw parts, and results in that presence of a highly insulating film on an area contacting with an electrode results fusion of iron due to overheating and causes deformation of the screw parts. Therefore, it is important to coat only the thread of the screw parts without adhering the coating composition onto any parts other than the thread.

The method of coating the thread only may be carried out as follows. In the case of the bolt, the most simple method may include a method which comprises dip coating once the external thread only in a vertical, longitudinal position placing the external thread down, and heating and drying as it is without extracting a remaining liquid coating composition by a centrifugal force to form a coated film. On the other hand, the method of coating only the internal thread of the nut may include a method which comprises positioning the internal thread hole in a vertical, longitudinal direction, closing a bottom of the internal thread hole with a closing plate, injecting a liquid coating composition into the internal thread hole from upper side to coat the internal thread with the liquid coating composition, followed by sucking up the liquid coating composition upward, or followed by removing the closing plate at the bottom and discharging the liquid coating composition downward, a method which comprises positioning the internal thread hole in a vertical, longitudinal direction, inserting a pipe with pores into the internal thread hole, pressurizing a liquid coating composition filled in the pipe, and allowing the liquid coating composition to flow out of the pores to coat the internal thread only in the internal thread hole, and a method which comprises inserting a pipe into the internal thread hole from the bottom, allowing a liquid coating composition to flow upward through the pipe so as to overflow at an upper end of the pipe and form a liquid film on the external surface of the pipe, and contacting the internal thread in the internal thread hole with the liquid film to coat the internal thread only.

On coating only the thread of the screw parts according to the above coating method, for the purpose of controlling at such a suitable film thickness that coating properties of a thread crest is satisfied and that reduction in fastening workability due to too thick film thickness on a thread flank and thread root may be avoided, the solid content and viscosity of the coating composition are controlled, resulting in making it possible to obtain good properties in edge covering properties and uniformness of film thickness.

In the present invention, in addition to the above dip coating method, a method comprising masking parts other than the thread, followed by spray coating may also be applicable.

The coating composition used in the present invention has a solid content of 3 to 20% by weight, preferably 8 to 13% by weight. When less than 3% by weight, the resulting film is too thin as a whole to be satisfactory in obtaining a spatter adhesion-preventing effect and an electrodeposition coating film deposition-preventing ability. When more than 20% by weight, the resulting film is so thick as a whole that troubles may be produced in fastening workability.

A thixotropic viscosity properties is necessary for maintaining a uniformness of film thickness. Accordingly, use of a thickening agent capable of imparting thixotropic properties to the coating composition is necessary. The thickening agent to meet with the above requirements may include, for example, a long chain fatty acid ester polymer, fatty acid amide, sulfate based anionic active agent, finely divided silica dispersed beforehand in the organic resin constituting the coating composition. Of these, the fatty acid amide most easily provides the thixotropic viscosity properties and provides excellent finish properties.

The use of the thickening agent in the coating composition makes it possible to control viscosity and thixotropic index, so that the viscosity may be in the range of 10 to 500 centipoise/60 rpm, preferably 100 to 300 cp/60 rpm as measured by Brookfield rotational viscometer, and the thixotropic index, i.e. a ratio of a viscosity at 6 rpm to that at 60 rpm is in the range of 2 to 7, preferably 4 to 6. When the viscosity is less than 10 centipoise, the resulting film is too thin as a whole to obtain a satisfactory electrodeposition coating film deposition-preventing ability. On the other hand, when more than 500 centipoise, the resulting film is so thick that troubles are produced in a screw-fastening workability. When the thixotropic index is less than 2, a coated coating composition may easily flow, resulting in that a film thickness difference between upper and lower parts may be increased to be lack of uniformness in film thickness, that coating properties of the thread crest may be unsatisfactory, and that the electrodepossition coating film deposition-preventing ability may be reduced.

On the other hand, when the thixotropic index is more than 7, an amount of the thickening agent used is so increased that the resulting film may become brittle, and may be too thick as a whole, resulting in producing troubles in fastening workability.

The thickening agent necessary for controlling the viscosity and thixotropic index as above is used in an amount of one to 20 parts by weight per 100 parts by weight of the organic resin.

The above control of the solid content, viscosity and thixotropic index makes it possible to obtain maintenance of a complete coating properties of the thread crest and uniformness of film thickness on the thread flank and thread root. However, for the purpose of completely preventing the deposition of the cationic electrodeposition coating film, a film formed from the coating composition is required to have a volume resistivity of $10^{14}$ Ω·cm or more at normal temperature. When the volume resistivity is less than the above, an increased electrical conductivity causes deposition of the electrodeposition coating film, resulting a very poor screw-fastining workability.

The coating composition used in the present invention, if needed, may include an organic solvent, coating surface-controlling agent, anti-foaming agent, coloring agents such as pigments and dyes, filler and the like known in the art respectively.

The above organic resin based coating composition is coated onto the thread of the screw parts, followed by heating and drying by use of a circulating hot air oven, an infrared rays irradiation apparatus, or a combined apparatus of the circulating hot air oven with the infrared rays irradiation apparatus to form a film. The drying temperature is in the range of 100 to 180° C., and the drying time is in the range of 10 to 60 minutes.

The reason why the surface-treating method of the present invention makes it possible to prevent the adhesion of the spatter scattered on welding and the deposition of the electrodeposition coating film during the cationic electrodeposition coating step to obtain good screw-fastening workability and torque stability, may be guessed as follows.

First of all, the thread-coating properties must be satisfactory for preventing adhesion of the spatter and preventing deposition of the electrodeposition coating film. At the same time, formation of a film having a high uniformness in film thickness is important for the fastening workability. Accordingly, a sufficient increase in the thixotropic index of a liquid coating composition makes it possible to quickly stop the liquid coating composition flowing without causing any collection of the liquid coating composition on pulling up the thread after dipping, resulting in making it possible to maintain good uniformness in film thickness and good edge covering properties on the thread crest.

Controlling of the solid content and viscosity of the coating composition of the present invention makes it possible to accomplish control of film thickness. A coated film thickness on the thread crest can be 3 to 10 μm so as to be effetive on preventing the spatter from adhering. A surface degradation by heat on the organic resin film due to contact with the spatter scattered in a heat fused state greatly reduces adhesion properties with the spatter, resulting in that the surface only of the coated film may be slightly scorched and that adhesion of the spatter may be prevented.

The coated film has a high volume resistivity and shows excellent insulating properties, resulting in showing little or no electrical conductivity in a film thickness of 1 μm or more and in completely preventing deposition of the electrodeposition coating film.

The organic resin used in the present invention has a good adhesion properties to iron and shows a good resistance to chemicals used in degreasing and chemical treatments by use of alkali or acid as a step prior to the electrodeposition coating step even in such a thin film as to be a few μm thick, resulting in providing good screw-fastening workability without being stripped from the thread.

The surface-treating method of the screw parts according to the present invention makes it possible to obtain good edge covering properties on the thread crest and uniformness of film thickness of the coated film on the thread by controlling the solid content and viscosity of the highly insulating, liquid organic resin based coating composition in a specified range on coating beforehand the liquid coating composition on the thread of the screw parts, and thereby makes it possible to prevent adhesion of spatters onto the thread and deposition of the electrodeposition coating film on the thread, resulting in making it possible to obtain good screw parts-fastening workability and good torque stability on screwing. Therefore, the surface-treating method of the present invention provides such remarkable effect as to greatly reduce manhours for mounting the screw parts onto the automobile body by welding compared with the method of masking the thread of the screw parts in the prior art.

The surface-treating method of the present invention is also applicable to various automobile parts required to prevent the depositon of the electrodeposition coating film in addition to the screw parts, resulting in being very useful for improvements in working efficiency and reduction of manhours.

The present invention will be explained more in detail by the following Examples and Comparative Examples, which should give no limitations to the present invention, and in which "part" and "%" represent "part by weight" and "% by weight" respectively.

EXAMPLE 1

To 100 parts of hydroxy group-containing fluoroacrylic resin AS-1302(Trade name, marketed by Mitsubishi Rayon Co., Ltd., solid content 50%, fluorine atom content 17%, hydroxyl number 52, weight average molecular weight 20000) were added 10 parts of di-i-propoxy.bis (acetylacetone) titanate and 10 parts of high-melting fatty polyamide as a thickening agent to be mixed, followed by diluting with a mixed organic solvent (xylene:butyl acetate:butyl cellosolve weight ratio of 4:3:3) to obtain a liquid coating composition having a solid content of 10%, a viscosity of 220 centipoise/60 rpm and a thixotropic index of 5.6. Next, the liquid coating composition was charged into a dipping vat, and an external thread of a M-10 bolt degreased with methyl ethyl hetone and having a thread pitch of 1.25 mm was dipped into the liquid coating composition in the dipping vat at a dipping speed of 1 m/min. in a vertical, longitudinal position, followed by keeping in the dipped state for 5 seconds, pulling up the bolt, leaving to stand for 5 minutes at room temperature, and drying at 120° C. for 15 minutes to form a coated film onto the external thread. Test results are shown in Table 1.

COMPARATIVE EXAMPLE 1

An untreated iron, M-10 bolt having a thread pitch of 1.25 mm was degreased with methyl ethyl ketone without coating the coating composition of Example 1 onto the thread and was subjected to tests as in Example 1. The results are shown in Table 1.

EXAMPLES 2–4 AND COMPARATIVE EXAMPLES 2–3

Respective liquid coating compositions having liquid coating composition properties as shown in Table 1 were prepared in the same manner as in Example 1 by use of the same hydroxy group-containing fluoroacrylic resin as in Example 1 except that the resin used in Example 4 has a fluorine atom content of 24%. Coated films were formed on the external thread by use the resulting liquid coating compositions in the same manner as in Example 1 respectively

EXAMPLE 5

To 100 parts of the modified epoxy resin, Epiclon H-305 (Trade name, marketed by Dainippon Ink and Chemicals, Inc., primary hydroxy equivalent 2500, secondary hydroxy equivalent 270, number average molecular weight 8000) was added 12 parts of high-melting fatty polyamide as a thickening agent to be mixed, followed by diluting with a mixed organic solvent(xylene:butyl acetate:butyl cellosolve weight ratio of 4:3:3) to obtain a liquid coating composition having a solid content of 10%, a viscosity of 260 centipoise/60 rpm, and a thixotropic index of 5.3. Next, the liquid coating composition was charged into a dipping vat, and an external thread of a M-10 belt degreased with methyl etyl ketone and having a thread pitch of 1.25 mm was dipped into the liquid coating composition in the dipping vat at a dipping speed of 1 m/min. in a vertical, longitudinal position, followed by keeping in the dipped state for 5 seconds, pulling up the bolt, leaving to stand for 5 minutes at room temperature, and drying at 120° C. for 15 minutes to form a coated film onto the external thread. Test results are shown in Table 1.

EXAMPLE 6

To 100 parts of the modified epoxy resin, Epiclon H-305 (Trade name, marketed by Dainippon Ink and Chemicals, Inc., number average molecular weight 8000) were added 12 parts of high-melting polyamide and 15 parts of Desmodur TPLS-2759 (Trade name, marketed by Sumitomo Byel Urethane Co., Ltd., blocked isocyanate resin) to be mixed, followed by diluting with a mixed organic solvent (xylene:butyl acetate:butyl cellosolve weight ratio of 4:3:3) to obtain a liquid coating composition having a solid content of 10%, a viscosity of 245 centipoise/60 rpm and a thixotropic index of 5.6. Next, the liquid coating composition was injected into an internal thread hole of a M-10 nut having a thread pitch of 1.25 mm and degreased with methyl ethyl ketone from upper side through a narrow-necked nozzle in such a state that the internal thread hole faces upward and a bottom hole is closed with a flat board, followed by sucking up the liquid coating composition remaining in the hole through a vacuum nozzle, leaving to stand the nut in a vertical, longitudinal position for 5 minutes at room temperature, and drying at 140° C. for 10 minutes in a circulating hot air dryer to coat the internal thread. The test results are shown in Table 1.

EXAMPLES 7–8 AND COMPARATIVE EXAMPLES 4–5

Respective liquid coating compositions having liquid coating composition properties as shown in Table 1 were prepared in the same manner as in Example 5 by use of the same modified epoxy resin as in Example 5. Coated films were formed on the external thread by use of the resulting liquid coating composition in the same manner as in Example 5 respectively.

EXAMPLE 9

To 100 parts of an alkyd resin-modified silicone resin TSR 180 (Trade name, marketed by Toshiba Silicone Co., Ltd., acid value 98) was added 10 parts of the high-melting fatty polyamide to be mixed, followed by diluting with a mixed organic solvent (xylene:butyl acetate:butyl cellosolve weight ratio of 4:3:3) to obtain a liquid coating composition having a solid content of 8%, a viscosity of 240 contipoise/60 rpm, and a thixotropic index of 5,6. Next, the liquid coating composition was charged into a dipping vat, and an external thread of a M-10 bolt degreased with methyl ethyl ketone and having a thread pitch of 1.25 mm was dipped into the liquid coating composition in the dipping vat at a dipping speed of 1 m/min in a vertical, longitudinal position, followed by keeping in the dipped state for 5 seconds, pulling up the bolt, leaving to stand for 5 minutes at room temperature, and drying at 150° C. for 40 minutes in a circulating hot air dryer to form a coated film onto the external thread. Test results are shown in Table 1.

EXAMPLE 10

A liquid coating composition having liquid coating composition properties as shown in Table 1 was prepared in the same manner as in Example 9 by use of the same alkyd resin-modified silicone resin as in Example 9. A coated film was formed on the external thread by use of the resulting liquid coating composition in the same manner as in Example 9. Test results are shown in Table 1.

EXAMPLE 11

To 100 parts of an epoxy resin-modified silicone resin TSR194 (Trade name, marketed by Toshiba Silicone Co., Ltd., acid value 12) was added 7 parts of the high-melting fatty polyamide to be mixed, followed by diluting with a mixed organic solvent (xylene:butyl acetate:butyl cellosolve weight ratio of 4:3:3) to obtain a liquid coating composition having a solid content of 10%, a viscosity of 110 centipoise/60 rpm and a thixotropic index of 5.1. Next, the liquid coating composition was charged into a dipping vat, and an external thread of a M-10 bolt degreased with methyl ethyl ketone and having a thread pitch of 1.25 mm was dipped into the liquid coating composition in the dipping vat at a dipping speed of 1 m/min. in a vertical, longitudinal position, followed by keeping in the dipped state for 5 seconds, pulling up the bolt, leaving to stand for 5 minutes at room temperature, and drying at 150° C. for 30 minutes in a circulating hot air dryer to form a coated film onto the external thread. Test results are shown in Table 1.

EXAMPLE 12

A liquid coating composition having liquid coating composition properties as shown in Table 1 was prepared in the same manner as in Example 11 by use of the same epoxy resin-modified silicone resin as in Example 11. A coated film was formed on the external thread by use of the resulting liquid coating composition in the same manner as in Example 11.

COMPARATIVE EXAMPLE 6

To 100 parts of a water-dispersible acrylic acid-modified polyethylene resin, Nippollan 3202 (Trade name, marketed by Nippon Polyurethane Industry, Co., Ltd., solid content 20%) were added 60 parts of a colloidal silica and 3 parts of an acrylic emulsion based thickening agent, Primal ASE-60 (Trade name, marketed by Rohm & Haas Co.) to be mixed, followed by diluting with water to abtain a liquid coating composition having a solid content of 16%, a viscosity of 160 centipoise/60 rpm and a thixotropic index of 4.1. Next, the liquid coating composition was charged into a dipping vat, and an external thread of a M-10 bolt degreased with methyl ethyl ketone and having a thread pitch of 1.25 mm was dipped into the liquid coating composition in the dipping vat at a dipping speed of 1 m/min. in a vertical, longitudinal position, followed by keeping in the dipped state for 5 seconds, pulling up the bolt, leaving to stand for 5 minutes at room temperature in a circulating hot air dryer to form a coated film onto the external thread. Test results are shown in Table 1.

Test methods are as follows.

Volume Resistivity:

A sample was coated onto a bright finished steel sheet by a bar coater, followed by drying at 120° C. for 15 minutes to obtain a test panel having a coated film thickness of 5 μm, and measuring a volume resistivity by use of a flat board test panel measuring electrode, SME-8310 (Trade name, marketed by Toa Electronics Ltd.).

Fastening Properties:

A screwing test by hand-screwing a nut to a bolt, or a bolt to a nut was carried out in the following two samples, i.e. a first sample prepared by surface-treating an external thread or an internal thread of a M-10 bolt or M-10 nut having a thread pitch of 1.25 mm, and a second sample prepared by subjecting the first sample to a cationic electrodeposition coating respectively.

The electrodeposition coating conditions are as follows.

| Cationic electrodeposition coating composition | HB-2100 (Trade name, marketed by Kansai Paint Co., Ltd.) |
| --- | --- |
| Coating voltage | 270 V |
| Distance between electrodes | 18 cm |
| Energized time | 180 sec. |
| Electrodeposition coating composition temperature | 28° C. |

Evaluation Grading:

4: A nut easily passes through to a rout of an external thread of a bolt.

3: The nut easily passes through to the rout of the external thread of the bolt by hand, but with some resistance.

2: Difficult to pass through due to biting, but the nut can barely be screwed in by hand.

1: The nut can not be screwed in to the root of the external thread.

The above evaluation criteria 3 and 4 are practically available.

Spatter Adhesion Properties:

Five bolts, which have been subjected to a surface-treatment with a coating composition, were welded and fixed on a flat board at an interval of 3 cm in a vertical, longitudinal position. At a position 10 cm apart from the above bolts, an arc welding was carried out to examine presence of adhesion of spatters scattered onto the bolts during the welding.

Evaluation Criteria:

4: No adhesion of the spatter onto the thread is observed.

3: Adhesion onto the thread is observed a little, but is to such an extent as to be easily removable by touching with hand.

2: Adhesion of the spatter all over the thread is observed to be rather difficult for removing.

1: Adhesion of the spatter is in such a large amount as not to be easily removable by hand.

The above evaluation criteria 3 and 4 are practically available.

Thread Crest Coating Properties:

A thread crest of a bolt was subjected to a surface treatment with a coating composition followed by examining the thread crest through a magnifier to evaluate coating conditions. On the other hand, a thread of a bolt or nut was subjected to a surface treatment with a coating composition, followed by cutting the resulting bolt or nut in a longitudinal direction to measure a film thickness under a microscope.

Evaluation Criteria:

4: The thread crest is completely coated in an average film thickness of 5 μm or more.

3: The thread crest is coated, but is in a rather thin film thickness of 2 to 5 μm.

2: The thread crest is almost coated, but in a thin film thickness of 1 to 2 μm.

1: The thread crest is party uncoated to be in an average film thickness less than 1 μm.

The above criteria 3 and 4 are practically available.

Adhesion Properties:

A coating composition was coated onto a bright finished steel sheet, followed by drying at 120° C. for 15 minutes to prepare a test panel having a dry film thickness of 10 μm. The test panel was subjected to an adhesion test by use of a cross cut cellophane tape having 100 squares of 1 mm$^2$.

Evaluation is represented by a number of squares remaining without being peeled off, that is, "100" means that none of 100 squares was peeled ff, and "80" means that 20 squares were peeled off.

TABLE 1

| Items | | | Examples | | | | | | | | | | | |
| --- | --- | --- | --- | --- | --- | --- | --- | --- | --- | --- | --- | --- | --- | --- |
| | | | 1 | 2 | 3 | 4 | 5 | 6 | 7 | 8 | 9 | 10 | 11 | 12 |
| Kind of organic resin | | | Fluoroacrylic resin | | | | Modified epoxy resin | | | | Alkyd resin-modified silicone resin | | Epoxy resin-modified silicone resin | |
| Liquid coating composition properties | solid content (%) | | 10 | 7 | 15 | 12 | 10 | 10 | 12 | 9 | 8 | 15 | 10 | 15 |
| | *1) viscosity (centipoise) | | 220 | 120 | 350 | 240 | 260 | 245 | 400 | 300 | 240 | 130 | 110 | 100 |
| | *2) thixotropic index | | 5.6 | 4.8 | 5.8 | 5.3 | 5.8 | 5.6 | 5.9 | 5.7 | 5.6 | 5.2 | 5.1 | 4.6 |
| Volume resistivity ($10^{14}$ Ω · cm) | | | 15 | 12 | 15 | 13 | 8 | 11 | 10 | 10 | 8 | 10 | 9 | 10 |
| Fastening properties | after surface treatment | | 4 | 4 | 3 | 4 | 4 | 4 | 3 | 4 | 4 | 3 | 4 | 3 |
| | after cationic electrodeposition coating | | 4 | 3 | 3 | 4 | 4 | 4 | 3 | 4 | 4 | 3 | 3 | 3 |

TABLE 1-continued

| Spatter adhesion properties | 4 | 3 | 4 | 4 | 4 | 4 | 4 | 4 | 3 | 4 | 3 | 4 |
|---|---|---|---|---|---|---|---|---|---|---|---|---|
| Thread crest coating properties | 4 | 3 | 4 | 4 | 4 | 4 | 4 | 4 | 3 | 4 | 3 | 3 |
| Adhesion properties | 100 | 100 | 100 | 100 | 100 | 100 | 100 | 100 | 100 | 100 | 100 | 100 |

| | | | Comparative Examples | | | | | |
|---|---|---|---|---|---|---|---|---|
| | Items | | 1 | 2 | 3 | 4 | 5 | 6 |
| | Kind of organic resin | | None | Fluoro-acrylic resin | Modified epoxy resin | | | Water dispersible acrylic acid modified polyethylene resin |
| Liquid coating composition properties | solid content (%) | | — | 2 | 22 | 12 | 8 | 16 |
| | *1) viscosity (centipoise) | | — | 120 | 250 | 8 | 600 | 150 |
| | *2) thixotropic index | | — | 4.1 | 5.8 | 1.8 | 6.2 | 4.1 |
| Volume resistivity ($10^{14}$ Ω · cm) | | | — | 11 | 15 | 10 | 10 | 0.06 |
| Fastening properties | after surface treatment | | — | 3 | 1 | 2 | 1 | 4 |
| | after cationic electrodeposition coating | | 1 | 1 | 1 | 1 | 1 | 2 |
| Spatter adhesion properties | | | 1 | 2 | 4 | 2 | 4 | 3 |
| Thread crest coating properties | | | — | 2 | 4 | 1 | 4 | 3 |
| Adhesion properties | | | — | 100 | 100 | 100 | 100 | 100 |

*1) Measurement of viscosity:
Viscosity was measured by Brookfield rotational viscometer using No. 2 rotor under the conditions of 60 rpm and 20° C.
*2) Measurement of thixotropic index:
The thixotropic index is represented by a ratio of a viscosity measured by the above Brookfield rotational viscometer under 6 rpm to that similarly measured under 60 rpm.

What is claimed is:

1. A surface-treating method of screw parts having threads, which method comprises:

coating a one pack type, heat curable liquid organic resin based coating composition having a solid content of 3 to 20% by weight, a viscosity of 10 to 500 centipoise and a thixotropic index of 2 to 7, and capable of forming a film having a volume resistivity of $10^{14}$ Ω·cm or more at normal temperature, completely covering thread surfaces only of screw parts, said organic resin based coating composition comprising (a) an organic resin based composition containing a hydroxy group-containing fluoroacrylic resin prepared by copolymerizing comonomers of perfluoroalkyl (meth) acrylate and hydroxy group-containing vinyl monomer and having a fluorine atom content of 10 to 40% by weight, a crosslinking agent, and a thickening agent, or (b) an organic resin based composition containing a modified epoxy resin prepared by substituting a primary hydroxy group for epoxy groups at both molecular chain terminals of bisphenol type epoxy resin and having a number average molecular weight of 3000 to 10000, and a thickening agent;

heating and drying said coated screw parts to form the film having a uniform film thickness all over the thread surfaces only;

mounting said heated and dried coated screw parts by welding onto automobile parts selected from the group consisting of body, chassis and suspension; and applying a second coating composition consisting of an electrodeposition coating composition to the automobile parts, said liquid organic resin based coating composition being coated onto the thread surfaces only of screw parts by a method which comprises dip coating the thread surfaces only of screw parts in a vertical, longitudinal position; and said heated and dried coated screw parts showing improved properties in fastening properties, spatter adhesion-preventing properties, and thread crest coating properties.

2. A method as claimed in claim 1, wherein the screw part is a nut having an internal threaded portion and the liquid organic resin based coating composition is coated, completely covering the internal thread surfaces only of the nut by a coating method selected from the group consisting of (i) a method which comprises positioning the internal thread hole in a vertical, longitudinal direction, closing a bottom of the internal thread hole with a closing plate, injecting the liquid organic resin based coating composition into the internal thread hole from upper side to be full, followed by sucking up the liquid coating composition upward to coat the internal thread only, (ii) a method which comprises positioning the internal thread hole in a vertical, longitudinal direction, closing the bottom of the internal thread hole with a closing plate, injecting the liquid coating composition into the internal thread hole from upper side to fully contact the internal thread with the liquid coating composition, followed by removing the closing plate at the bottom and discharging the liquid coating composition downward to coat the internal thread only, (iii) a method which comprises positioning the internal thread hole in a vertical, longitudinal direction, inserting a pipe with pores into the internal thread hole, pressurizing the liquid coating composition filled in the pipe and allowing the liquid coating composition to flow out of the pores to fully coat the internal thread only, and (iv) a method which comprises inserting a pipe into the internal thread hole from the bottom, allowing the liquid coating composition to flow upward through the pipe so as to overflow at an upper end of the pipe and form a liquid film on the external surface of the pipe, and fully contacting the internal thread with the liquid film to coat the internal thread only.

3. A method as claimed in claim 1, wherein the organic resin based coating composition is a composition containing a hydroxy group-containing fluoroacrylic resin prepared by copolymerizing comonomers of perfluoroalkyl (meth) acrylate and hydroxy group-containing vinyl monomer and having a fluorine atom content of 10 to 40% by weight, a crosslinking agent, and a thickening agent.

4. A method as claimed in claim 1, wherein the organic resin based coating composition is a composition containing a modified epoxy resin prepared by substituting a primary hydroxy group for epoxy groups at both molecular chain terminals of bisphenol type epoxy resin and having a number average molecular weight of 3000 to 10000, and a thickening agent.

* * * * *